3,477,851
PROCESS FOR PREPARING A FILLED
FOOD PRODUCT
John O. Benson, Mayer, and Peter Smirnow, Minneapolis, Minn., assignors to General Mills, Inc., a corporation of Delaware
Filed Jan. 29, 1965, Ser. No. 429,170
Int. Cl. A23l 1/18
U.S. Cl. 99—83        7 Claims

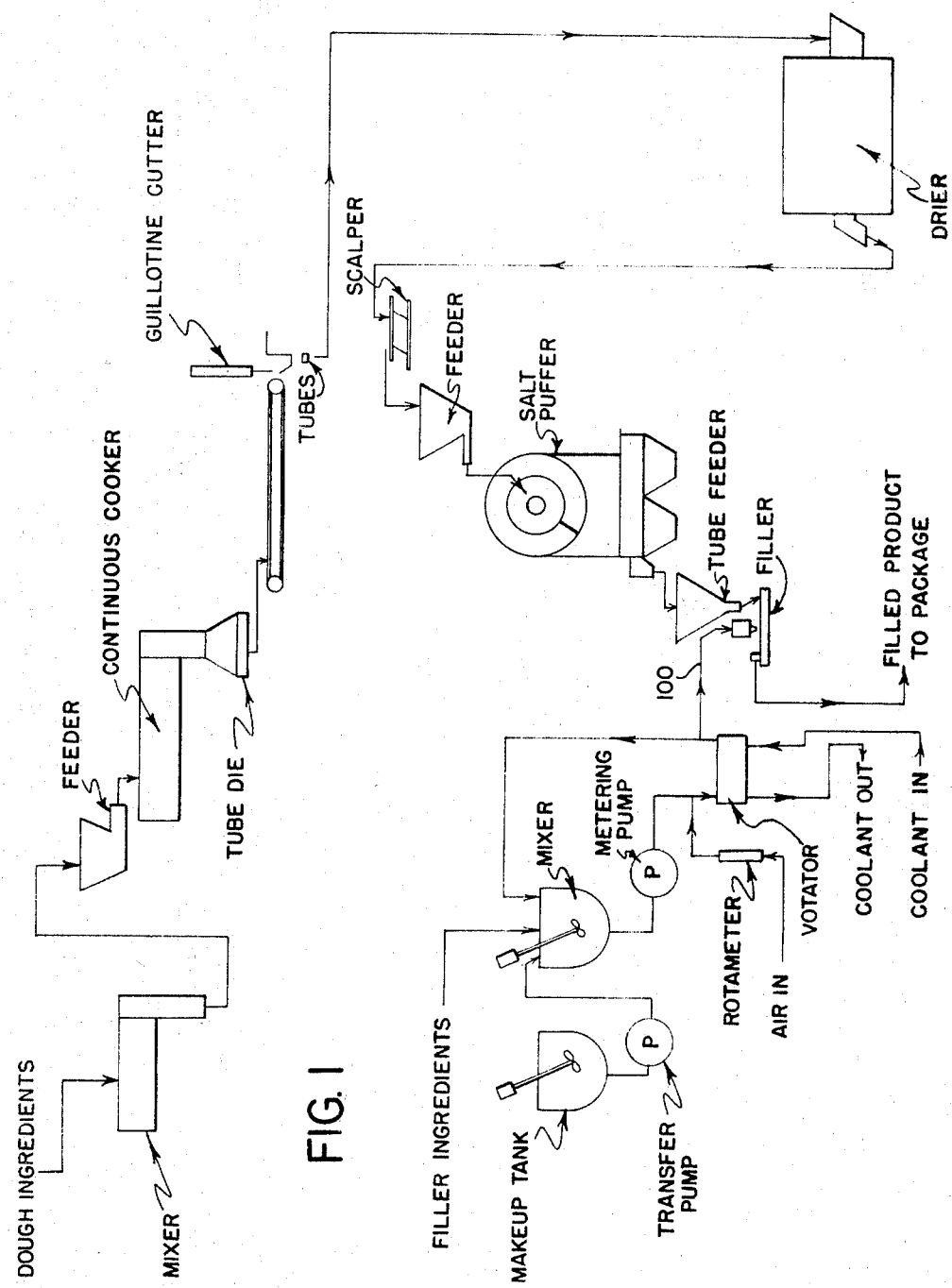
FIG. I
INVENTORS
JOHN O. BENSON
PETER SMIRNOW
BY
*Robert R. Hughes*
ATTORNEY

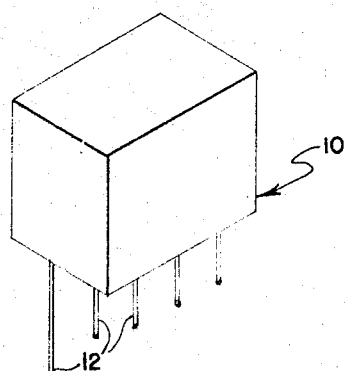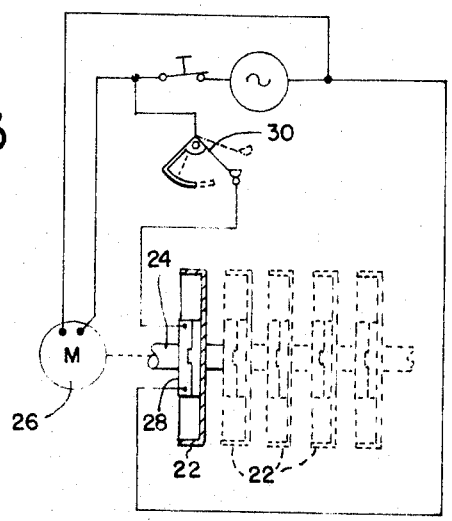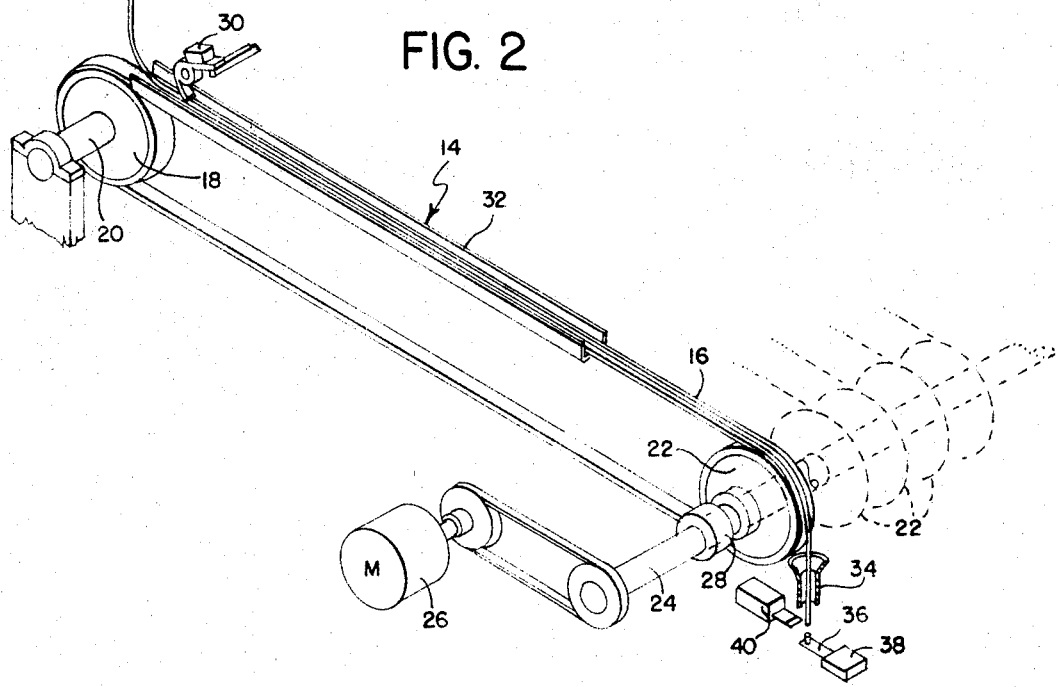
FIG. 3
FIG. 2
INVENTORS
JOHN O. BENSON
PETER SMIRNOW
BY
*Robert B. Hughes*
ATTORNEY Nov. 11, 1969  J. O. BENSON ET AL  3,477,851
PROCESS FOR PREPARING A FILLED FOOD PRODUCT
Filed Jan. 29, 1965  4 Sheets-Sheet 3
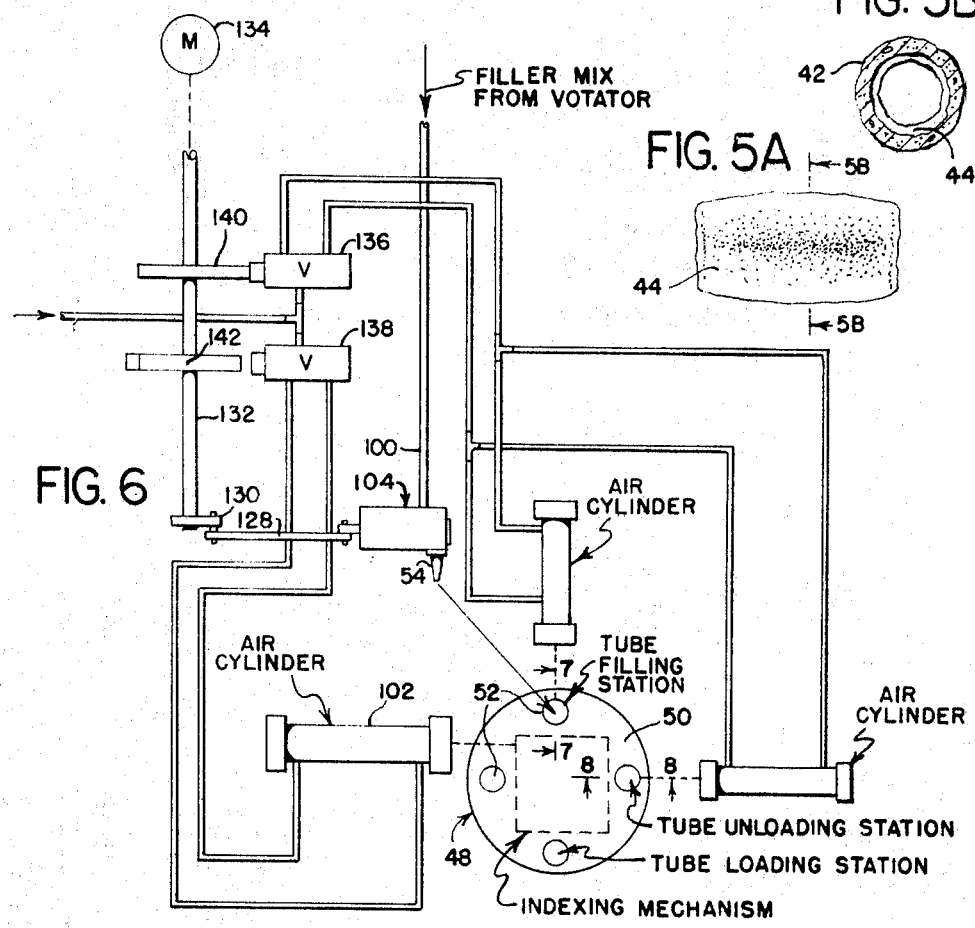
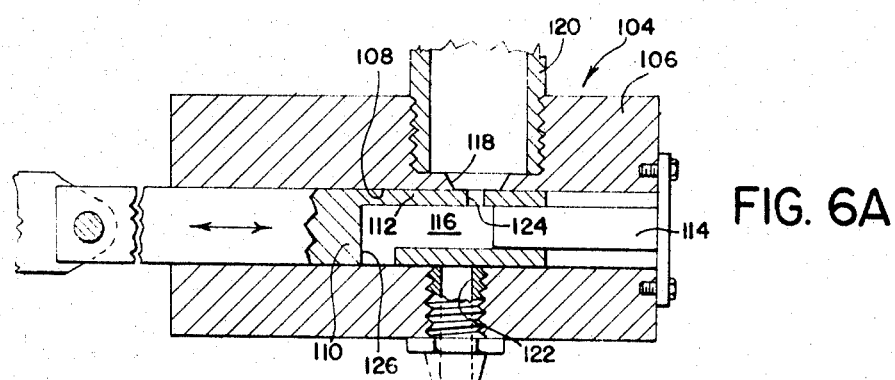
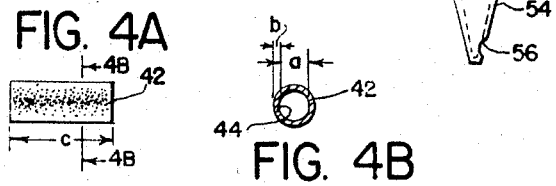
INVENTORS
JOHN O. BENSON
PETER SMIRNOW
BY
Robert B Kugler
ATTORNEY

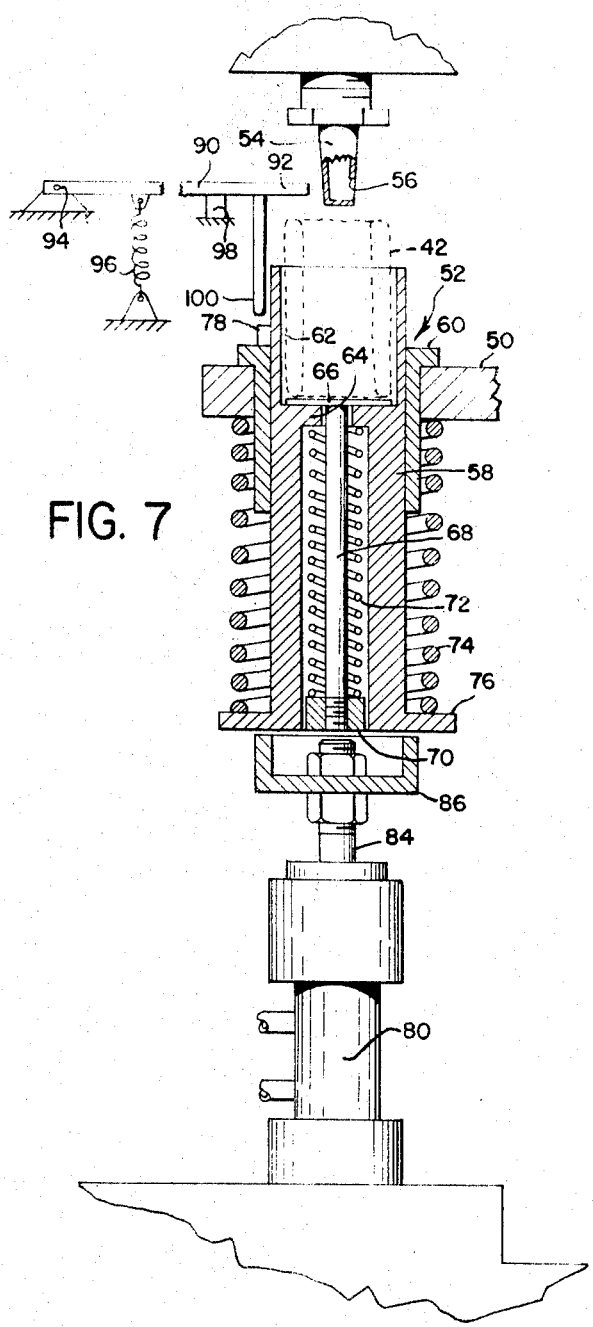
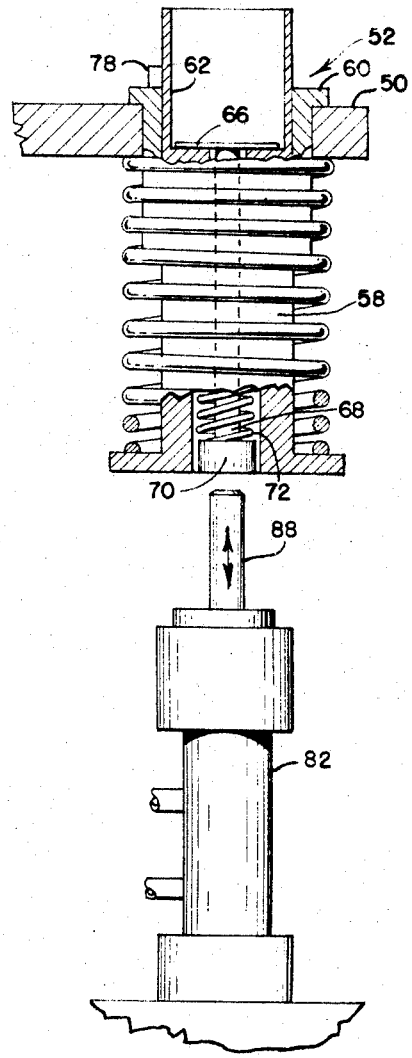

ABSTRACT OF THE DISCLOSURE

A tubular shell is formed of a cooked dough which is shaped, dried, and expanded by puffing; a filling material comprised of a body contributing ingredient and an edible fat is then injected into the tubular shell.

---

The present invention relates to a new and improved food product and to a method for making the same, which food product can properly be categorized as a "snack."

The food products which are sold in the general category of snack items are many and varied, including such things as chips (e.g., potato chips, corn chips), puffs (e.g., corn puffs), etc., and they account for a large dollar volume in the food industry. Generally, these are eaten apart from a regular meal, for example, as party snacks or as appetizers, sometimes with spreads or fillings, or the like. Often different snack items are served at the same time, perhaps in different snack dishes or in an hors d'oeuvre tray presenting a variety of these and other food items for the choice of the guests or customers.

People generally regard these snacks rather discriminatingly and do not expect to gain from them a great deal of their day's nourishment. Rather a person will sample the various snacks in a leisurely manner, centering his choice on those snacks which have some sort of special appeal. Thus it is quite understandable that while manufacturers of snacks have done considerable work in developing refinements in their established products and in maintaining good quality control in the manufacture thereof, a good deal of creative effort has been directed toward making snack products which are distinctive in some regard, so that such a product might have some particularly appealing quality not existing in other snack products.

One type of snack product which has been found to be especially appealing is a puff-type snack which is made by forming a cooked dough into pieces of the desired shape and then puffing these pieces by subjecting them to an intense heating, such as by deep fat frying, salt puffing, or heating in some type of oven. Some snack products of this type made from a corn dough have experienced a good deal of commercial success. This step of intensely heating the dough not only develops delectable flavor characteristics in the end product, but also gives a very desirable puffed, low density structure that has a crisp, yet tender texture. If the intense heating is performed by means other than deep fat frying, the end product is often sprayed with oil (this contributing to the flavor of the product), and the product is sometimes salted or coated with some other substance such as cheese-like particles.

Because of the nature of the processing steps required for this type of snack product, it has been especially difficult to devise any improvements which can practically be incorporated in the process. For example, the main ingredients, the method of cooking and the manner of puffing by intense heating all must be controlled within rather well defined limits to obtain the desired qualities of taste, texture, etc. of the end product. The pieces of dough which are to be subjected to the intense heating must be so shaped that they will puff uniformly. Further, this puffing by intense heating will usually expand and bend the pieces somewhat unpredictably so that even though the dough pieces prior to the intense heating can be formed into a rather precise shape, this precision will be largely lost in the subsequent intense heating, and the pieces will twist and bend into various configurations. Thus for these and perhaps other reasons, in spite of the commercial importance of snack products (hundreds of millions of dollars worth being sold annually), the significant and original improvements in snack products have been relatively few.

Quite often, snacks are eaten with a dip or spread. Usually the snack pieces are placed on the same tray or table as the dip but separate therefrom so that a person can take a snack piece in hand and scoop up a portion of the dip, while less often the snack pieces are served with the dip or spread applied directly thereto. This latter practice is done more often with crackers or cracker-like snack products which are processed in such a manner as to be of rather uniform size and shape, and are flat and do not break up too easily. Thus it is an easy matter to place a spread on the crackers manually with a knife and of course it is quite practical to accomplish the same mechanically on a large production basis, with the result that such cracker products are made commercially in "sandwich" form, with a cheese spread or the like placed between two crackers.

However, with puff-type snack products, there are certain difficulties in devising such a product which can conveniently be combined with a dip or spread just prior to serving, and especially to develop such a product which can be sold as a commercial item with a dip or spread already added thereto. One reason, which is especially significant with regard to a commercial operation, is the aforementioned fact that the puffing by intense heating causes the pieces to expand and bend or twist somewhat unpredictably. Thus, the resulting snack pieces are difficult to handle mechanically and it is, of course, quite impractical to put them together in sandwich form.

In addition to the above-mentioned difficulty, there is the further problem that these puff-type snack products have a tendency to break unpredictably when a person bites into the snack piece. This is probably due to several factors such as the crispness of the product along with its particular cell structure, and also variations in the shape of the pieces. The result is that if the snack pieces are each combined with a spread in some manner (for example, if the housewife, before serving the pieces places a portion of a dip or spread on each piece or if somehow this were done commercially), the chances are that as the pieces are eaten, parts of them not yet in the person's mouth break off and fall away with the spread placed thereon smearing on the floor or on the person himself. Thus, the more practical approach has been to serve the dip or spread separately in a dish. A person can then take the snack in hand and scoop a portion of dip onto one edge or end of the snack piece. Then the person can place that edge or end of the snack piece in his mouth in such a manner that the dip is entirely within his mouth, and any portion of the snack piece outside his mouth that breaks away will at least not have any dip thereon to cause smearing.

In view of these aforementioned considerations, it is a principal object of the present invention to provide a new and improved snack product and a process for making the same, wherein in each snack piece, a puffed cereal rerived portion and a filling portion are quite advantageously combined.

The cereal derived portion is made by forming a cooked dough into tubular pieces and subjecting the same to final intense heating so as to puff the same, so that the resulting pieces have the flavor, texture, the light, puffy yet crisp structure, and other characteristics desired in a high quality puff-type snack product. The filling portion is placed inside each of the puffed tubular pieces, and is a viscous food product that can be made in a great variety of formulations to create with the puffed pieces a delectable snack combination. This filling material can quite desirably have the character of a snack dip (e.g., a viscous cheese-like product).

Thus it may be stated as another object to provide such a product and method for making the same, which product comprises a cereal derived puffed portion and a filling portion, the former having the desired characteristics of a high quality puff-type snack product and the latter having the desired characteristics of a material such as a spread, dip or other material that can be delectably and practically combined with the cereal-derived puffed portion.

Yet another object is to provide such a process and product wherein the snack pieces can conveniently be handled without breaking the pieces or smearing the filling. In this regard, the filling is isolated within the tubular piece and spaced inwardly from each end opening thereof. Thus the filled pieces can easily be packaged, and also when being used, can be poured into a serving bowl; in neither case is there any smearing of the filling material. Beyond this, the tubular piece (which is, in effect, a shell surrounding the filling) is relatively quite resistant to fracture, not only with respect to being handled (for example, as part of the packaging operation), but also with respect to its being eaten by the final consumer. With regard to this latter factor, the snack piece has the unusual advantage that when a person bites into the snack piece, the piece very rarely has a part thereof break off and fall away. Instead, when a person bites off part of a snack piece, the rest of it remains intact, and it too can conveniently be bitten into without a part of the then remaining portion fracturing off and falling away. Thus the filling material very rarely smears onto the person or floor or furniture, either as a result of a part of the snack piece falling away or by the piece collapsing or fracturing so as to squeeze the filling out.

Related to this last recited feature, is the further object of providing a process and product wherein a low density filling (e.g., a whipped or otherwise aerated or foamed material) can quite advantageously be used in that the filling will not be deformed or squeezed out of the tubular piece during the eating thereof. The effect is that of a quite desirable product, especially for a snack, since the filling is a light, delicate material; and also this permits a certain economy of manufacture since less filling material is required to occupy a substantial portion of the cavity defined by the cereal piece.

A yet further object of some importance is to provide such a product and process which can practically be incorporated in a full scale commercial operation. To enlarge upon this, it is to be noted that the tubular dough pieces can be formed by a high production multiple extrusion process which permits various adjustments in the processing conditions thereof, and the pieces can be cut to a relatively precise uniform length, and be of a very regular tubular configuration. The dimensions and configuration of each piece are such that even though the piece are then puffed by intense heating, the resultant puffed pieces are not bent or warped to any appreciable extent, but maintain a relatively regular cylindrical shape. This greatly facilitates the subsequent handling and filling of these pieces. An important factor is that these particular pieces can be filled in an especially convenient manner so that during the filling operation the filling does not become smeared upon either the puffed pieces or on the equipment. Thus the filled snack pieces can be packaged quite cleanly as a finished product, and when served to the ultimate consumer, quite conveniently provide the benefits of a puffed snack and dip combination, but without the mess and inconvenience which would otherwise accompany the same.

Thus it is an additional object to provide means to fill the tubes in an especially convenient manner.

These and other objects and features of the invention will be more readily understood and appreciated from the following detailed description of the preferred embodiments thereof selected for purposes of illustration and shown in the accompanying drawings, in which:

FIGURE 1 is a schematic drawing illustrating a preferred embodiment of the present invention;

FIG. 2 is a semi-schematic perspective view illustrating one manner in which a plurality of tubular extrusions can be cut into tube pieces of the desired length;

FIG. 3 is a schematic drawing showing the control circuitry for the apparatus shown in FIG. 2;

FIG. 4A is a side elevational view of a tube piece cut by the apparatus of FIG. 2;

FIG. 4B is a sectional view taken on line 4B—4B of FIG. 4A;

FIG. 5A is a side elevational view showing the piece of FIG. 4A after being puffed by a final intense heating;

FIG. 5B is a sectional view taken on 5B—5B of FIG. 5A;

FIG. 6 is a semi-schematic drawing illustrating an apparatus by which filler is inserted into the tube pieces;

FIG. 6A is a side elevational view, drawn partly in section of the filling dispensing device of the apparatus of FIG. 6;

FIG. 7 is a sectional view taken along line 7—7 of FIG. 6 to illustrate apparatus by which a portion of filling material is inserted into a tubular piece at the filling station, and FIG. 8 is a sectional view taken along line 8—8 of FIG. 6 and illustrating apparatus by which a tube piece is discharged after being filled.

The process of the present invention can be summarized quite generally as follows:

(a) Forming a cooked dough into tubular pieces within predetermined dimensions (to be disclosed hereinafter), and then puffing these lengths by an intense heating to make puffed tubes, (b) preparing a filling material, and (c) injecting portions of said filling material into each of said puffed tubes.

MAKING THE PUFFED TUBES

(a) Ingredients

The ingredients for the dough which is made into the puffed tubes are primarily a cereal product and water. Corn, wheat, oats, barley, rye, and other cereals and combinations thereof are suitable for use in the present invention, and generally the dehulled cereal product is used (e.g., corn grits). Of course, other ingredients can be, and preferably are, incorporated in addition to the cereal product and the water, to give a particular character to the flavor and other qualities of the end product. For example, salt, sugar, starch and gums could quite advantageously be added. The selection and quantity used will depend largely upon the character desired for the end product, and there are, of course, certain practical limits (known generally in the art), as to the quantity of the various ingredients to be used. For example, the sugar should be limited to about 12% of the total ingredients or possibly less, since during the final intense heating, the product will tend to burn if an excessive amount of sugar has been incorporated into the product. Generally the cereal ingredient or ingredients will make up at least 50% of the total ingredients by weight. However, it is to be understood that varying amounts of starch may dients, and possibly a certain amount of an inert substance (e.g., cellulose or fiber-containing material) might also be added (this perhaps being done if a low-calorie type of snack product is desired).

(b) Cooking

The ingredients are mixed and cooked to form a gelatinized dough. One suitable method is to use one of the continuous cookers known in the art which cook the ingredients in a steam jacketed vessel. Another method is to cook the ingredients mechanically (i.e., work the ingredients mechanically so as to impart heat to the same).

Often, in these cooking processes, water is added to the ingredients during the course of the cooking. The amount of water used as an original ingredient and the amount of water added during the course of the cooking should be such that the moisture content of the cooked dough at the completion of the cooking be between about 20 to 35% based upon total weight. At this moisture content, the dough is in the best condition for further processing.

(c) Forming the tubular pieces

After being cooked, the dough is formed into a tubular configuration of predetermined dimensions and then cut into pieces of the desired length. Forming a tube of dough is conveniently done by forcing the dough (as by means of an auger-type feed mechanism known in the art) through an extrusion die. An extrusion die which is suitable for use in the present invention is disclosed in a patent application being filed concurrently with the present application, entitled Tubular Food Process and Product, the inventor being John O. Benson, Ser. No. 429,171, filed Jan. 29, 1965.

It is to be understood that in a full scale commercial operation the dough might well be extruded through a plurality of orifices and that the several extruded tubes would then have to be cut into pieces all of the same length. This prevents a problem in that the linear rate at which dough is extruded depends upon various factors, such as the precise cross-sectional configuration of the extruding orifice, also the dough's viscosity which in turn depends upon other factors such as temperature, moisture, differentiation in formulation, etc., and the pressure at which the dough is being pushed through the extruding orifice. Further in such a commercial operation, a single dough feeding mechanism may be feeding the dough to several orifices at the same time, but not necessarily at the same pressure at each orifice. For this latter reason, and also sometimes for the reason that some of the factors which affect extrusion rates may be desired to be changed by way of making adjustments in some of the processing conditions (e.g., moisture content of the dough), it is not always practical to attempt to control the rate of extrusion through each or any orifice with any great precision. As will become more apparent hereinafter, the length of the tube pieces cut should be kept within rather precise limits, and to accomplish this, certain means were devised, these being shown in FIGS. 2 and 3 of the accompanying drawings.

In FIG. 2, a multiple extrusion apparatus is indicated schematically at 10, and a plurality of tubular dough ropes 12 are shown being continuously emitted from this extruding mechanism 10. A tube conveying and cutting mechanism, designated generally 14, is provided for each of the ropes 12, but for simplicity of illustration, only one of these mechanisms 14 is shown fully herein.

Each of these mechanisms 14 comprises a longitudinally aligned endless belt 16 which trains over a rear idler roller 18 mounted for free rotational movement on a rear axle 20 that is located below the extruder 10, and over a front drive roller 22. The front drive roller 22 is mounted on (but not fixed to) a main drive shaft 24 driven from a suitable power source 26. Power is transmitted from the shaft 24 to the drive roller 22 through a magnetic clutch, indicated at 28, which is normally in its engaging position so that the drive roller 22 rotates with the shaft 24. (Each of the other drive rollers 22 of each of the other conveying and cutting units 14 is likewise provided with such a magnetic clutch 28.)

Each of the tubular dough ropes 12, as it leaves the extruder 10, drops onto the forward moving upper run of the conveyor belt 16. The speed of the shaft 24 is such that the speed of the belts 16 (with its respective magnetic clutch 28 engaged) is moderately greater than the maximum linear rate of extrusion of any one of the tubular ropes 12. The result is that the rear portion of each of the dough ropes 12 (i.e., that portion nearer the extruder 10) will lift off the rear of the belt 16 and engage a switch 30 so as to close the same. When this happens to any one of the dough ropes 12, it closes a circuit through its respective magnetic clutch so as to disengage the same and stop the movement of its respective belt 16. As the particular rope 12 continues to be extruded, it drops away from the switch 30, thus permitting the switch 30 to open and break the circuit through the respective magnetic clutch 28 so that this clutch 28 engages to start the movement of the belt 16 again. Thus, since each of the units 14 is provided with such a control switch 30 connected to its respective magnetic clutch 28, the rate at which each of the ropes 12 is carried by its respective belt 16 is overall the same as the linear rate of extrusion of its respective rope 12.

As each rope 12 is extruded onto its respective belt 16, a respective channel-like guide 32 guides its related rope along the upper run of its belt 16, and each rope 12 travels an arcuate path around the front roller 22 and descends in a vertical path through a second guideway 34. Mounted so as to extend into the descending path of each rope 12 is a respective yielding finger 36 operatively connected to a related switch 38 which controls the action of a respective cutter shown schematically at 40. The finger 36, switch 38 and cutter 40 are so arranged that when the forward end of the rope 12 pushes the finger 36 a predetermined distance, the cutter 40 severs the rope 16 at a predetermined location. Thus these pieces cut from the rope 12 are all of the same length, regardless of the linear rate of extrusion. It is to be understood that each of the feeding and cutting mechanisms 14 is provided with such a finger 36, switch 38 and cutter 40, with the result that all of the pieces cut from the various tubular rope 12 are of the same length. After this cutting, the pieces are gathered in an appropriate manner to be dried.

(d) Dimensions of the tube pieces

As indicated previously, the dimensions of the tube pieces (one of which shown at 42 in FIGS 4A and 4B) which are made by this extruding and cutting step, are quite significant in the present invention. The inside diameter of each piece 42 (indicated at "a" in FIG. 4 B) should be greater than ⅛ inch and for best results is at least about 3/16 inch. One reason for this is that with the diameter too small, it is simply not practical during the intense heating (by which the puffing is accomplished) for the heating medium (e.g., frying oil if deep fat frying is employed, or salt particles if salt puffing is used) to be able to pass sufficient heat to the inside surface 44 of the piece 42 to accomplish properly the puffing by the intense heating. Also, the inside diameter of each of the pieces 42 should be sufficiently large to permit some tolerance for the insertion of the filler into each of the pieces 42.

On the other hand, the inside diameter should certainly be no greater than about ½ inch, and for best results is no greater than about ⅜ inch. With the diameter too large, not only does it become impractical, and also quite difficult, to fill the tubular pieces which are the end product, but the end product fractures and breaks up too easily when being eaten. Also, with the inside diameter too large, during the puffing by intense heating, be substituted for part of the cereal ingredient or ingrethe wall of the piece 42 tends more to bend and warp from a rather regular tubular configuration, while the pieces having an inside diameter with the desired dimensions, in being puffed during the intense heating, keep to a greater degree their regular tubular configuration. It can be theorized that with the inside diameter within the proper limits, the space within each piece 42 is sufficiently large to permit enough heat transfer to the inside surface 44 of each piece 42 to obtain proper puffing, and yet this inside space is small enough that the gases (e.g., steam) entitled from the inside surface 44 of the piece 42 offers some center support to prevent the wall of the piece 42 from collapsing inwardly. Perhaps also with the desired dimensions, the curvature of the wall is sufficient to give a certain "arch-like" support to prevent portions of the wall from collapsing inwardly.

The wall thickness (indicated at "b" in FIG. 4B) of each piece 42 before the puffing by intense heating is also significant in the present invention, and should be at least between .015 and .07 inch, and for best results should be between about .025 and .06 inch. With too small a wall thickness, the piece 42 shatters too easily both upon being handled and upon being eaten, and with too large a wall thickness it is not possible to obtain complete and uniform puffing during the intense heating.

The length (indicated at "c" in FIG. 4a) of each piece 42 should be between at least about ¼ inch and 1½ inches, and more desirably between about ½ inch and 1 inch. With the piece 42 too long, it is not possible for the final intense heating medium (e.g., frying oil or salt particles) to have sufficient access into the interior of the piece 42 to impart enough heat to properly puff the same. Also, with the length too small, the facility with which these tubular pieces can be filled is largely lost. (This will become more apparent when this facet of the present invention is discussed hereinafter). And, with the length too great, it becomes more difficult to handle and orient the pieces 42 in a manner to fill the same.

(e) Drying

After the extruding and cutting, the resulting pieces 42 are dried to a moisture content between about 7—12% (based on total weight) and desirably to between about 8–10%. Within this approximate range, the pieces will puff properly during the subsequent intense heating. This drying can conveniently be accomplished by exposing the pieces to the surrounding atmosphere at room temperature for about a half day or a day, or moderately hot air (e.g., having a temperature of perhaps about 150° F.) can be paseed through the pieces for a suitable period (e.g., about 4 hours). If the latter method of drying is used, it is usually desirable to let the tube pieces stand for about 2 hours at room temperature, so that the moisture contained therein will equalize throughout the product.

(e) Puffing by intense heating

These tube pieces 42 are then subjected to an intense heating, such as that which is commonly employed with cereal-type products such as some ready-to-eat breakfast cereals and various snack products. This intense heating not only develops certain desired flavor components in the product but also serves to puff and expand the same so as to approximately double the overall dimensions and to give the product a desired lightness in texture and cell structure, along with a certain degree of crispness. The precise manner by which the intense heating is accomplished will depend upon various things, such as the quality of the end product desired, the practicality of using the same in a particular commercial operation, etc. However, this intense heating should be done in such a manner that an adequate amount of heat is transferred to the inside surface 44 of each piece 42. Deep fat frying has been found to be quite acceptable in this respect and so has salt puffing. One method of accomplishing this salt puffing is to feed the pieces 42 into a rotating drum containing discrete heated salt particles which surround the pieces 42. The drum is rotated at a rate sufficient to keep the pieces 42 immersed in salt so that salt particles pass inside the pieces 42 sufficiently to puff the pieces 42 from the inside as well as the outside.

The processing conditions necessary for puffing by intense heating are well known in the art. Thus when a salt puffer is used the temperature of the salt particles should be between about 300 to 450° F., and desirably between 380 to 420° F., and the residence time in the drum would be between about 20 to 24 seconds. If deep fat frying is used as the particular means of accomplishing the final intense heating, the oil fat temperature would be between about 320 to 420° F., and for best results at about 390° or 400° F., and the frying time would be about 10 to 25 seconds. As is well known in the art, these conditions will vary depending upon such things as the wall thickness of the pieces being puffed, etc.

It has been found that with a tubular snack product which is within the dimensions specified herein, the puffed cell structure of the product contributes significantly to the structural stability of the same (i.e., that quality which enables the snack piece not to break up when a person bites into the same). Generally speaking, the density should be at least as low as about 6 pounds per cubic foot to give the pieces this character of structural stability and yet provide it with a texture and cell structure which is desirable for a puffed-type snack product, and most desirably would be between about 4 to 5 pounds per cubic foot. (These densities are based on weight of the product not including any oil that would be absorbed during frying or added in some other way such as by spraying if the product is not deep fat fried.)

At the completion of this puffing by intense heating, the tube pieces (one of which is shown at 5A and 5B) have the characteristics of a high quality finished snack product, and are ready to be filled with a suitable material such as that to be described hereinafter.

PREPARING AND INSERTING THE FILLING PORTION (a) Ingredients

The ingredients for the filling of the present invention should be such that the resultant filling material:

(a) Has a moisture content such that when the filling is inserted into the tube pieces and comes into moisture equilibrium with the same, the moisture content of the tube pieces will be within desired limits, (which usually will be not above about four to six percent), (b) Has a viscosity such that the filling can be injected into the pieces 42 and yet remain in the pieces 42 without flowing out, (c) And of course will be sufficiently stable so that the end product will have a shelf life which permits it to be manufactured and sold on a commercial scale.

One type of filling that has been found to be able to be used quite advantageously in the present invention is one made primarily from a "body" contributing ingredient and an edible fat whose melting point is at least moderately above the upper limit of the ambient temperatures to which the snack products would be exposed. (This would normally be one which is solid at temperatures at least up to 100° F.) Coconut oil has been found to be quite practical and desirable for use in such a filling, but other fats could also be used.

Various ingredients can be used to make up the body portion. For example, dehydrated cheese particles can be used to make a quite delectable filling that has the character of a cheese dip for snack products. In this case the filling can be made by mixing approximately equal portions of such cheese particles and coconut oil, along with possibly small amounts of flavoring and coloring ingredients.

Several other formulations which result in quite delectable fillings are as follows:

I

| | Percent |
|---|---|
| Meat powder | 50 |
| 110° F. melting point coconut oil | 50 |

II

| | |
|---|---|
| 110° F. melting point coconut oil | 50 |
| Honey Spread (made by Honey Sales Co. in Minneapolis) | 50 |

III

| | |
|---|---|
| 110° F. melting point coconut oil | 50 |
| Honey Spread | 48 |
| Freeze dried strawberries | 2 |

In the case of the last two filling formulas where Honey Spread is used, the moisture content of the filling is moderately above that of the tube piece into which the filling is inserted, and there will be a certain amount of moisture transfer from the filling to the tube piece. The result is that the tube pieces will soften somewhat to a more cookie-like texture, which, together with the sweet honey filling, makes a very desirable snack combination. In the formula using the meat powder, the moisture of the meat powder (and consequently the moisture content of the resultant filling since the coconut oil contains substantially no moisture) is quite low, and the tube piece will remain quite crisp. Other formulations meeting the general requirements for a filling of the present invention will occur to those skilled in the art, and these could well be devised to obtain certain qualities in perhaps the flavor, texture, or perhaps to give certain benefits with regard to such things as shelf life, quality control, economy of operation, etc.

(b) Preparing the filler

The particular method of preparing the filling will depend, of course, upon such things as the formulation of ingredients and the character desired for the filling. As indicated previously, the filling should be of such a viscosity to permit being inserted into the tubes, and yet not to run out, once it is within the tubes. Also, for several reasons, it is desirable that the filling be a low density produce (e.g., an aerated or whipped product). Not only does this make the operation more economical in that less filling material is used, but the filling has a "lighter" character which is more desirable for a snack-type product which is eaten more to whet, rather than to satisfy, the appetite.

The diagram of FIG. 1 illustrates schematically a method of preparing one of the fillings disclosed previously herein. The total ingredients are placed in a make-up tank where they are mixed and maintained at a temperature sufficiently high so that the coconut oil remains liquid. The mixed ingredients are pumped into a mixer and are fed by a pump into a scraped wall heat exchanger like a votator which functions to whip air into the product while cooling the same. These votators are well known in the art, and generally comprises a jacketed cylinder defining a chamber in which a blade rotates.) Air is metered into the cylinder in the desired amount, and the rotating blade whips air into the product as it moves in an arcuate path proximate the inside wall of the votator cylinder. Coolant is pumped through the jacket surrounding the chamber to cool the same. Thus, as the temperature of the mix is lowered, the cocaonut oil crystallizes as air is whipped into the mix, and the result is a somewhat viscous aerated mix.

(c) Inserting the filling into the tubes

A preferred method of inserting the filling into the finished tube pieces is best understood with reference generally to FIG. 1, and more particularly FIGS. 6–8. A relatively simplified apparatus for accomplishing the filling of these tube pieces is illustrated, and this is shown only semi-schematically, since it is believed this best discloses the process of the present invention. It is understood, of course, that in a full scale commercial operation, additional (perhaps more sophisticated) mechanical techniques could be employed.

Illustrated schematically in FIGS. 1 and 6 is a tube carrying device 48, which comprises a horizontally disposed indexing table 50 mounted for rotating movement about the vertical center axis thereof. Four identical tube receiving units 52 are mounted to this disc 50 at evenly spaced intervals about the peripheral portion thereof. Each of these units 52 functions to carry a finished tube piece 42 (positioned in proper vertical alignment) through a filling cycle, which comprises:

(a) Receiving a tube piece 42 at a tube loading station, (b) Carrying the tube piece to a filling station where the tube piece 42 is lifted into engagement with a suitable nozzle 54 which emits through its nozzle opening 56 charge of filling material into the tube piece 42, and the tube is then lowered from the nozzle 54, and (c) Then carrying the tube 42 to an unloading station, where the filled tube piece 42 is ejected from the unit 52.

One of such units 52 is disclosed in more detail in FIGS. 7 and 8, wherein each unit 52 is shown to comprise a generally cylindrical vertically aligned housing 58 mounted for vertical slide motion within a collar or bushing 60 which is in turn mounted to the indexing disc 50. The top end of the housing 58 is open and is formed with a vertically cylindrical pocket 62 which is formed moderately wider than and moderately shallower than, respectively, the width and length of the snack piece 42 which it is to receive. At the base of the pocket 62, the housing 58 is formed with an inwardly reaching lip 64 on which rests an ejector plate 66, this plate 66 forming, in effect, the floor of the pocket 62. Fixed to this plate 66 and depending therefrom down through the interior of the housing 58 is a stem 68 which terminates at about the lower end of the housing 58 and has threaded thereon a nut 70. A helical compression spring 72 is sleeved onto this stem 68 and presses from the housing lip 64 against the nut 70, so that the discharge plate 66 is normally urged downwardly against the lip 64.

Sleeved about the housing 58 is a second helical compression spring 74 which presses from the lower surface of the indexing disc 50 against an outwardly extending annular lip 76 formed at the lower end of the housing 58. The upper end of the housing 58 has fixed thereto an outwardly extending finger 78 to engage the top of the sleeve 60 and limit the lower-most position to which the spring 74 can urge the housing 58 (this lower-most limit being the normal position of the housing 58). Located beneath the indexing disc 50 with its tube carrying units 52 are a pair of vertically aligned air cylinders 80 and 82, the first of which is positioned beneath the unit 52 at the tube filling station, and the second of which is located beneath the unit 52 at the tube unloading station.

The first cylinder 80 has contained therein a piston (not shown) with an upwardly extending rod 84 on the upper end of which is annular-like head 86 arranged to engage the lower end of the housing 58 of each unit 52 at the tube filling station, and the other cylinder likewise has a piston and rod 88. The cylinder 80 with its piston is normally in a retracted position, and upon being extended, the head 86 pushes the housing 58 against the urging of the spring 74 to lift the housing 58 toward the dispensing nozzle 54 at the tube filling station. With the cylinder 80 and its piston at its fully extended position, the housing 58 is at such a height that the nozzle 54 extends a short distance into the upper open end of the tube piece 42 contained in the pocket 62 of the housing 58. When the cylinder 80, with its piston, is retracted the head 86 drops away, and the spring 74 causes the housing 58 to descend away from the nozzle 54, so that the indexing table 50 can move the unit 52 at the tube filling station through an increment of revolution to the tube unloading station.

There is also provided at the filling station an arm 90, the free end 92 of which extends over the tube piece 42 at the filling station, and the other end of which is pivoted to some stationary member 94. A spring 96 urges the arm 90 downwardly against a stop member 98, which serves to properly locate the arm 90 moderately above the top edge of the tube piece 42 at the filling station. Fixed to and depending from the arm 90 is a finger 100 which is engaged by the member 78 when the tube carrying unit 52 at the filling is raised so that the arm 90 is lifted so as to remain spaced above the tube piece 42. When the unit 52 then descends, if the tube piece 42 sticks to the nozzle 54 (because of the filling material yet in the nozzle 54 adhering to the filling portion discharged into the tube piece 42), the arm 90 in its descending motion will push the piece 42 free of the nozzle 54 so that it will drop into place in the pocket 62.

The upper end of the rod 88 is arranged to engage only the stem 68 which, as before indicated, is connected to the discharge plate 66. When the cylinder 82 with its piston is extended, the rod 88 pushes against the stem 68 to lift the discharge plate 66 to the top end of the pocket 62 so that the tube piece 42 in the pocket 62 can be discharged therefrom.

The indexing plate 50 is provided with a suitable indexing mechanism to move the indexing plate 50 through 90° increments of travel so that the tube containing units 52 are properly located at the various operating stations. Since such indexing mechanisms are common in the art, the same is shown only schematically in FIG. 6, and only an air cylinder and piston unit 102 (not shown) is shown the purpose of which is to move the indexing mechanism through its increments of travel. To dispense a predetermined quantity of filler material through the nozzle 54 into each tube 42, there is provided a dispensing unit, generally designated 104 and shown in FIG. 6A.

The unit 104 comprises a housing 106 having a bore 108 in which is slidably mounted for reciprocating motion therein a piston member 110. The head end of the piston 110 is hollowed out so as to form a sleeve-like portion 112 which fits slidably around an aligned plug 114 fixed to the housing 106. Thus the sleeve portion 112 with the plug 114 defines a chamber 116 into which filling material is received and discharged. For this purpose, the housing 104 has communicating with the bore 108 an inlet port 118 which leads from a feed line 120 which in turn leads from the discharge end of the votator, and has an outlet port 122 which leads from the bore 108 to the outlet 56 of the nozzle 54. The sleeve portion 112 of the piston 110 is formed with an inlet port 24 which, when the piston 110 is retracted (i.e., in the left hand position as it is shown in FIG. 6A), communicates with the inlet port 118, and an outlet port 126 which comes into communication with the port 122 when the piston is extended.

The piston 110 is connected through a rod 128 to a crank 130 mounted to a shaft 132 driven from a suitable power source 134. Thus it can be seen that in each cycle of revolution of the crank 130, as the piston 110 moves to its retracted left hand position (as seen in FIG. 6A), filling material is fed under pressure from the votator through line 120 to fill the chamber 116. When the piston 110 moves to its right hand position, the chamber 116 decreases in volume to initially compress the filling material contained therein, and when the ports 126 and 122 come into registration, the charge of material in the chamber 116 is discharged through the nozzle 54.

A single valve, shown schematically at 136, actuates both cylinders 80 and 82 simultaneously, and a second valve 138 actuates the air cylinder 102 to actuate the indexing mechanism. To actuate the valves 136 and 138 in proper timed relationship with the action of the dispensing unit 104, cam actuators 140 and 142 (for, respectively, valves 136 and 138) are mounted to the shaft 132 which drives the crank 130 which reciprocates the piston 110 of the dispensing unit 104. The action of the cam actuator 140 is such that the valve 110 is engaged for a sufficient length of time to hold in its extended position cylinder 80 (and also cylinder 82) to permit a charge of filling material to be dispensed from the nozzle 54 while the nozzle 54 is extending into the piece 42, after which the cylinder 80 retracts to permit the piece 42 to drop away from the nozzle 54.

Overall operating procedure

In the overall operating sequence of the present invention, the preparing of the finished tube pieces can proceed simultaneously with the preparation of the filling ingredients. As previously indicated, the dough ingredients are mixed and fed into a continuous cooker to be extended into tubes of the desired dimensions which are then cut into pieces of a predetermined length. These pieces are dried, fed through a scalper to separate out any broken fragments, and then subjected to an intense heat to puff and expand the same to form finished tube pieces. These tube pieces are then moved to a suitable feed mechanism which places in sequence each tube into a pocket 62 of one of the tube carrying units 52 at the tube loading station of the tube carrying device 50.

During the carrying out of the operation of manufacturing and depositing the tube pieces 42 into the tube carrying units 52, the filling material is being prepared. This is accomplished by feeding the filling ingredients from a make-up tank into a mixer, from which a metering pump feeds the ingredients to a votator which functions to cool and whip air into the mix. (However, it is to be understood that within the broader aspects of the present invention, other methods of aerating or foaming could be used, such as perhaps utilizing a gas, such as $CO_2$ and/or nitrous oxide, and dissolving the same into the filling under pressure, so that upon being discharged, the filling will become foamed.) The action of the votator generates pressure to feed the ingredients through a feed line 120 to a dispensing unit 104, with the overflow from the votator returning to the mixer. As disclosed earlier herein, the action of the dispensing unit 104 is such that during one cycle of revolution of the drive shaft 132, a predetermined charge of filling material is discharged from the nozzle 54. The action of the dispensing unit 104 is in timed relationship with the action of the air cylinders 80 and 82, so that the tube piece 42 at the tube filling station is lifted into engagement with the nozzle 54 while a charge of material is being dispensed from the nozzle 54.

When one charge of material is completely dispensed from the nozzle 54, it expands to a moderate extent, this being particularly so when, according to the preferred embodiments, the filling material is aerated or foamed in some manner. (Since the filling material is necessarily dispensed under pressure, the air or gas contained therein will expand upon the release of such pressure by discharge.) This discharge opening 56 of the nozzle 54 is directed at an angle from the axis of the stem 54 (i.e., toward the side wall of the tube piece 42). The overall effect is that the discharged material engages the inner surface 44 of the tube 42 and proceeds only a moderate distance further down the interior of the tube 42 and then spreads across the interior of the tube 42 and fills back toward the nozzle 54. Hence, very seldom is any of the filling material discharged through the tube to the bottom end thereof, and the filling is spaced inwardly from each tube end.

The present invention will be discolsed with more particularity in the following examples:

EXAMPLE I

The following ingredients are utilized:

| | Percent |
|---|---|
| Corn flour | 52 |
| Oat flour | 7 |
| Wheat starch | 3.5 |
| Salt | 2.0 |
| Sugar | 5.5 |
| Water | 30 |

A gelatinized dough is formed by cooking these ingredients in a jacketed cooker for a period of about 60 min. with the steam pressure in the jacket surrounding the cooking chamber being about 10 pounds per square inch. This gelatinized dough is fed by means of an auger-like extruder of the type produced by Ambretti Company through a die to form a tube of dough, the inside diameter of which is 19/64 inch and the wall thickness of which is 3/64 inch. This tube is immediately cut into lengths of about 3/4 inch and these pieces are dried by passing air at a temperature of 150° F. through said pieces for about four hours to reduce the moisture content thereof to about 8%. These tubular pieces are permitted to stand for about four hours and are then fried in coconut oil at a temperature of 390° F., for about 10 seconds.

The following ingredients were utilized to make a filling:

| | Percent |
|---|---|
| Kraft Chezing (dehydrated cheese particles) | 49.9 |
| 110° F. melting point coconut oil | 49.9 |
| Whitsons Liquid Zest Cheeze Flavor | 0.2 |

These ingredients were mixed at a temperature of about 120° F. and were fed into a votator along with air to form a whipped product which was cooled to about 70° F. The whipped product discharged from the votator was inserted by means of a dispensing mechanism, such as that shown in the accompanying drawings, into the tube pieces made according to the preceding paragraph.

EXAMPLE II

The same process is followed as in Example I, except that the filling is prepared by utilizing the following ingredients:

| | Percent |
|---|---|
| Meat powder | 50 |
| 110° F. melting point coconut oil | 50 |

EXAMPLE III

The same process is followed as in Example I, except that the following ingredients are used to make a filling

| | Percent |
|---|---|
| 110° F. melting point coconut oil | 50 |
| Honey Spread (made by Honey Sales Co. in Minneapolis) | 50 |

EXAMPLE IV

The same process is followed as in Example I, except that the following ingredients are used to make a filling:

| | Percent |
|---|---|
| 110° F. melting point coconut oil | 50 |
| Honey Spread | 48 |
| Freeze dried strawberries | 2 |

EXAMPLE V

The same procedure is followed as in Example I, except that instead of deep fat frying the tubular pieces, the pieces are placed in a rotating drum having salt particles at a temperature of about 420° F., the pieces being in the drum about 22 seconds.

EXAMPLE VI

The same process is follower as in Example V, except that the inside diameter of said pieces before puffing is 3/16 of an inch.

EXAMPLE VII

The same procedure is followed as in Example V, except that the thickness of said lengths before puffing is about 4/64 of an inch.

It should be understood that the foregoing is merely illustrative of a certain embodiment of the invention and many variations may be made by those skilled in the art without departing from the spirit and scope of the invention.

Now therefore we claim:

1. A process for making a filled snack product, said process comprising:
    (a) cooking ingredients comprising a cereal derived product and water to form a cooked dough,
    (b) extruding said dough into a tubular configuration having an inside diameter between about 3/16 to 3/8 inches,
    (c) cutting said pieces into lengths between about 1/2 inch to one inch,
    (d) drying said pieces to between 7 to 12 percent moisture content,
    (e) puffing the dough pieces by subjecting them to intense heating thus forming expanded tubular pieces,
    (f) orienting said pieces with respect to nozzle means, bringing said pieces into engagement with said nozzle means and injecting a filling material through said nozzle means into said puffed pieces, and
    (g) said filling material being foamed and having a sufficiently low moisture content so as to be in a condition of proper moisture equilibrium with said puffed pieces, and having such viscosity and character that said filling remains within said pieces without discharging through the opposite end thereof.

2. A process for making a filled snack product, said process comprising:
    (a) forming a cooked dough into tubular pieces of predetermined length, diameter and wall thickness, the inside diameter of said tubular pieces before puffing being between about 1/8 to 1/2 inch, and its length is between about 1/4 to 1/2 inches,
    (b) drying said tubular pieces to a moisture level of about 7–12%,
    (c) puffing the dough pieces by subjecting them to intense heating thus forming expanded tubular pieces,
    (d) orienting said puffed pieces with respect to nozzle means so that said puffed pieces and nozzle means are brought into engagement with each other,
    (e) inserting said nozzle means into one end of said puffed pieces, and
    (f) discharging a filling material through said nozzle means into said pieces thereby injecting into one end of each of said puffed tubular pieces a filling material which is sufficiently viscous to remain within said pieces, and which has a sufficiently low moisture content so as to be in a condition of proper equilibrium with said puffed pieces, the viscosity and character of said filling material being such that said filling material remains within said pieces without discharging through the opposite end thereof.

3. The process as recited in claim 2, which includes discharging said filling material from said nozzle means at an angle with respect to the lengthwise axis of said puffed pieces, thereby causing said filling material to engage an inside surface portion of each of said puffed pieces, thus preventing discharge of said filling material out the opposite end of said puffed pieces.

4. The process as recited in claim 2 wherein said filling comprises a body contributing material and a fat which is solid at normal room temperatures.

5. The process as recited in claim 4 which includes mixing said body contributing material and fat at a temperature above which said fat is solid, and cooling and whipping the resulting mixture to produce a foamed filling.

6. A process for making a filled snack product, said process comprising:
(a) forming a cooked dough into tubular pieces of predetermined length, diameter and wall thickness, the inside diameter of said tubular pieces before puffing is between about 3/16 to 3/8 inch, and its length is between about 1/2 to 1 inch,
(b) drying said tubular pieces to a moisture level of about 7–12%,
(c) puffing the dough pieces by subjecting them to intense heating thus forming expanded tubular pieces,
(d) orienting said puffed pieces with respect to nozzle means so that said puffed pieces and nozzle means are brought into engagement with each other,
(e) inserting said nozzle means into one end of said puffed pieces, and
(f) discharging a filling material through said nozzle means into said pieces thereby injecting into one end of each of said puffed pieces a filling material which is sufficiently viscous to remain within said pieces, and which has a sufficiently low moisture content so as to be in a condition of proper equilibrium with said puffed pieces, the viscosity and character of said filling material being such that said filling material remains within said pieces without discharging through the opposite end thereof.

7. The process as recited in claim 6, wherein said filling material that is injected in said puffed pieces is a foamed material, whereby it is better able to engage the inside surface of each puffed piece.

References Cited

UNITED STATES PATENTS

| | | |
|---|---|---|
| 754,549 | 3/1904 | Dietz. |
| 1,890,697 | 12/1932 | Scanlan _____ 99—81 |
| 2,674,958 | 4/1954 | Puls _____ 107—1 |
| 2,954,296 | 9/1960 | Clausi et al. _____ 99—82 |
| 3,054,677 | 9/1962 | Graham et al. _____ 99—82 |
| 3,310,006 | 3/1967 | Hasten et al. _____ 107—1 |

RAYMOND N. JONES, Primary Examiner

U.S. Cl. X.R.

99—81

PO-1050
(5/69)

UNITED STATES PATENT OFFICE
CERTIFICATE OF CORRECTION

Patent No. __3,477,851__   Dated __November 11, 1969__

Inventor(s) __John O. Benson and Peter Smirnow__

It is certified that error appears in the above-identified patent and that said Letters Patent are hereby corrected as shown below:

Col. 2, line 70, change "re-" to ---de- ---.
Col. 3, line 67, change "piece" to ---pieces---.
Col. 4, line 75, after "may" insert ---be substituted for part of the cereal ingredient or ingre- ---.
Col. 5, line 38, change "prevents" to ---presents---.
Col. 7, line 1, cancel "be substituted for part of the cereal ingredient or ingre-".
Col. 7, line 12, change "entitled" to ---emitted---.
Col. 7, line 51, change "paseed" to ---passed---.
Col. 9, line 48, change "produce" to ---product---.
Col. 9, line 70, change "cocaonut" to ---coconut---.
Col. 10, line 34, after "vertically" insert ---aligned---.
Col. 10, line 37, after "is" insert --- adapted---.
Col. 12, line 17, change "Overall operating procedure" to ---OVERALL OPERATING PROCEDURE---.
Col. 12, line 24, change "extended" to ---extruded---.
Col. 14, line 2, change "follower" to ---followed---.

SIGNED AND
SEALED
MAY 26 1970

(SEAL)
Attest:

Edward M. Fletcher, Jr.
Attesting Officer

WILLIAM E. SCHUYLER, JR.
Commissioner of Patents